(No Model.) 2 Sheets—Sheet 2.
E. J. MOORE.
FEED WATER HEATER.
No. 398,645. Patented Feb. 26, 1889.
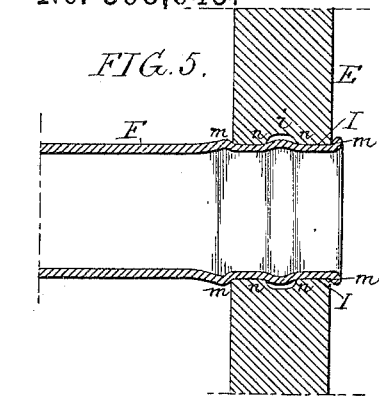
FIG. 5.
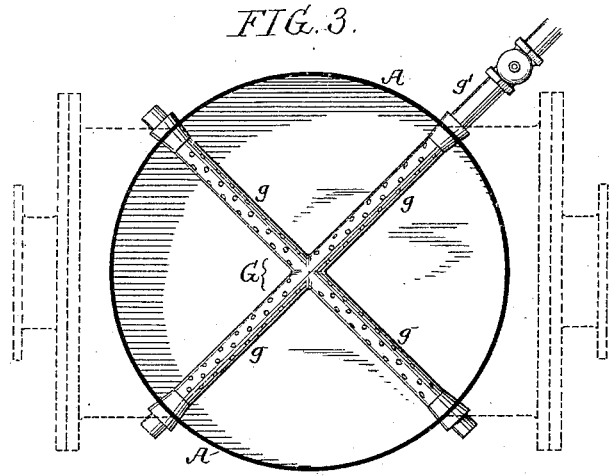
FIG. 3.
FIG. 6.
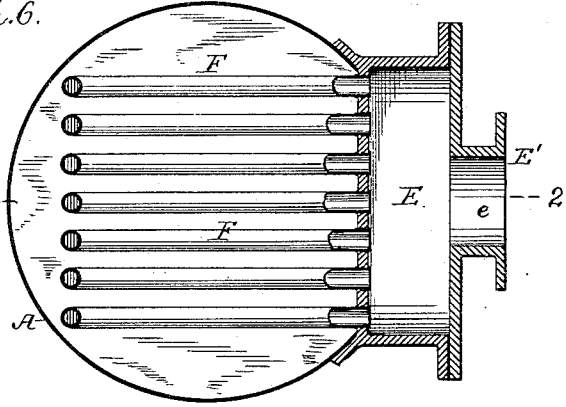
FIG. 4.
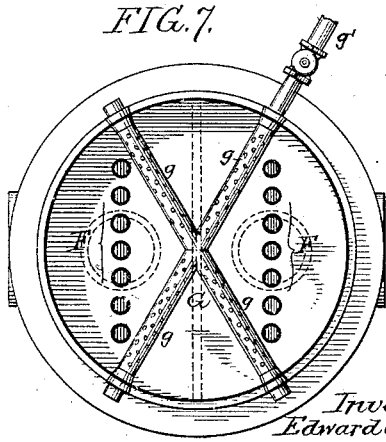
FIG. 7.
Witnesses
Hamilton D. Turner
Alex. Barkoff
Inventor
Edward J. Moore
by his Attorneys
Howson & Howson

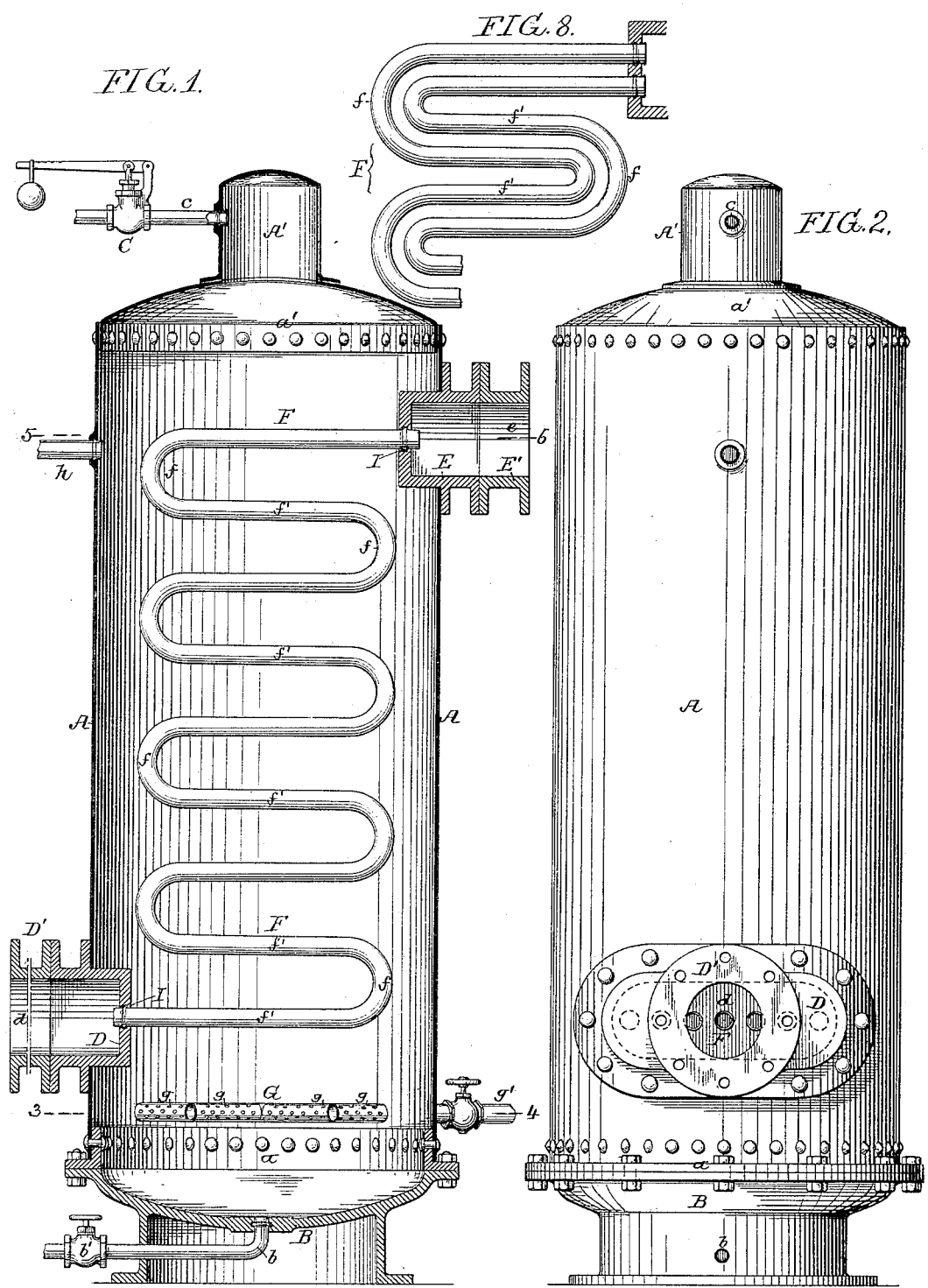

UNITED STATES PATENT OFFICE.

EDWARD J. MOORE, OF PHILADELPHIA, PENNSYLVANIA.

FEED-WATER HEATER.

SPECIFICATION forming part of Letters Patent No. 398,645, dated February 26, 1889.

Application filed February 10, 1888. Serial No. 263,609. (No model.)

*To all whom it may concern:*

Be it known that I, EDWARD J. MOORE, a citizen of the United States, and a resident of Philadelphia, Pennsylvania, have invented certain Improvements in Feed-Water Heaters and Purifiers, of which the following is a specification.

The object of my invention is to construct a feed-water heater and purifier which can be cheaply manufactured and at the same time have a large water capacity and an extended heating-surface, an object which I attain as fully described hereinafter, reference being had to the accompanying drawings, in which—

Figure 1 is a longitudinal section of my improved feed-water heater and purifier on the line 1 2, Fig. 4. Fig. 2 is a side view. Fig. 3 is a section on the line 3 4, Fig. 1. Fig. 4 is a section on the line 5 6, Fig. 1. Fig. 5 is a sectional detail. Figs. 6 and 7 are views of a modified form, and Fig. 8 is a view of another modification.

A is the casing of the heater, having a base-ring, $a$, and head $a'$, the base-ring being secured to the base B. Extending above the head $a'$ is a dome, A', having a blow-off pipe, $c$, provided with a suitable safety-valve, C, and inserted in the base is a blow-off pipe, $b$, provided with a suitable valve, $b'$.

D E are two saddles, the saddle D being located in the lower portion of the heater, while the saddle E is located in the upper portion of the same, and each saddle is provided with a suitable cap, D' E', having a flanged opening, $d$ or $e$.

F are a series of serpentine tubes of the peculiar form shown in Fig. 1, being bent only at the points $f$, forming a return-bend and having straight portions $f'$. One end of each tube enters the saddle D at the lower end, while the other end of each tube enters the saddle E at the upper end, and the tubes are arranged as close together as practicable, as shown in Fig. 4, thus affording a very large heating-surface.

G is a spray-tube situated, preferably, below the lower bend of the tubes F, as shown in Fig. 1, this tube being cruciform in shape and having four passages, $g$, the tubes of the spray-feed being punctured with a number of holes, so that a continuous and even spray of water to be heated is obtained. One of the passages $g$ is connected to the feed-pipe $g'$, while the others are plugged or suitably capped, to prevent the escape of water.

The advantage of constructing the spray-feed in this peculiar form is that by removing the plugs from the passages $g$ the latter can be readily cleaned by passing the cleaners from one end of the passages to the other, and a further advantage is that the heater can be set in any position irrespective of the water-supply, which can be connected to that one of the four passages $g$ which is most convenient. The heated water escapes through the pipe $h$.

The bent tubes F are steam-tubes and the saddle D is the steam-inlet, while the saddle E is the steam-outlet, the bent tubes allowing for any amount of contraction and expansion and at the same time affording an extended heating-surface; and, furthermore, the tubes made in this form can be bent very cheaply, for instead of the expensive plan of coiling the tubes, whereby each section of the coil has to be heated and bent, my improved tube requires only the heating of the return-bends, the rest of the tube being left cold. It will thus be seen that much time and labor are saved in the bending operation alone; and, furthermore, the tubes can be placed very near together, side by side, in a heater, or the tubes may be arranged not only in series side by side, but also in double rows, as shown in Fig. 8.

In expanding the tubes into the saddles D and E, I form a groove, $i$, around the opening I, as shown in Fig. 5, so that as the tube is expanded it will not only form a seat at the points $m$ $m$, but also at the points $n$ $n$ in the groove $i$; hence each of the tubes has practically four seats.

I am aware that it is not new to place two tube-sheets some distance apart with a space between them and to expand the tube in said sheets, so as to form a double sheet, as this is shown and claimed in an application filed by me on the 24th day of May, 1887, Serial No. 239,169.

In some cases I prefer to construct the feed-water heater and purifier with what may be termed "vertical bent tubes" or "serpentines," as shown in Figs. 6 and 7, the steam in this case entering at the opening $m$ in the base, passing up through the series of bent tubes F' into the dome P, and from this dome down the series of tubes F² into and through the outlet-opening N in the base, a partition, K, separating the two chambers. In this case the lower blow-off for the water is located a short distance above the base and the spray-pipes are located as shown in Fig. 6.

I claim as my invention—

1. The combination, in a feed-water heater, of the cylindrical casing, with oblong inlet and exhaust saddles inserted in the sides of said cylindrical casing and presenting internally plane faces parallel with each other, and a row of serpentine tubes in said casing, the lower ends of the tubes being secured to the saddle and the upper ends of the tubes to the other saddle, all substantially as described.

2. The combination, in a feed-water heater, of the cylindrical casing, with oblong saddles inserted therein, rows of tubes connecting said saddles, and caps for the saddles, each consisting of a plate having a central projecting flanged tube, substantially as described.

3. The combination, in a feed-water heater, of the casing with a spray-feed device cruciform in shape and having two or more of the tubes extending to the outside of the casing, substantially as and for the purpose described.

4. The combination, in a feed-water heater, of the casing with a spray-feeding device having four tubular arms, each arm extending to and supported by the casing, and each arm adapted to be secured to the inlet-pipe, substantially as and for the purpose set forth.

In testimony whereof I have signed my name to this specification in the presence of two subscribing witnesses.

EDWARD J. MOORE.

Witnesses:
WILLIAM D. CONNER,
HARRY SMITH.